United States Patent [19]
Hanning

[11] 3,848,716
[45] Nov. 19, 1974

[54] PNEUMATIC OPERATED MOTOR AND BRAKE FOR HOIST

[75] Inventor: John R. Hanning, Bryan, Ohio

[73] Assignee: The Aro Corporation, Bryan, Ohio

[22] Filed: June 14, 1973

[21] Appl. No.: 370,172

[52] U.S. Cl. ............................. 192/3 R, 188/170
[51] Int. Cl. .................................... F16d 55/18
[58] Field of Search ............................ 192/3 N

[56] References Cited
UNITED STATES PATENTS

| | | | |
|---|---|---|---|
| 2,927,669 | 3/1960 | Walerowski | 192/3 N |
| 3,043,412 | 7/1962 | Bartholomaus et al. | 192/3 N |
| 3,208,565 | 9/1965 | Heckt | 192/3 N |
| 3,536,230 | 10/1970 | Williams | 192/3 N |

*Primary Examiner*—Benjamin W. Wyche
*Attorney, Agent, or Firm*—Molinare, Allegretti, Newitt & Witcoff

[57] ABSTRACT

An improved brake construction for a rotary air motor driven hoist includes a brake wheel mounted on the output shaft of the air motor. The brake wheel is axially movable and biased toward engagement with a brake drum mounted on the air motor housing. The opposite side of the brake wheel is in communication with the air supply to the air motor. Air pressure thus translates the brake wheel axially against the spring force and out of engagement with the brake drum whenever air is supplied to the air motor.

10 Claims, 4 Drawing Figures

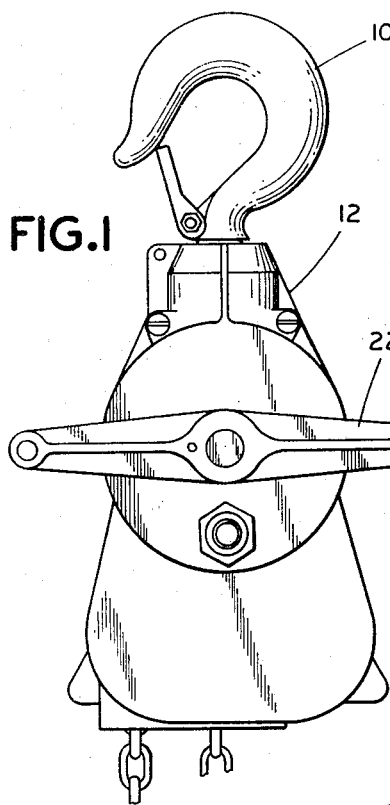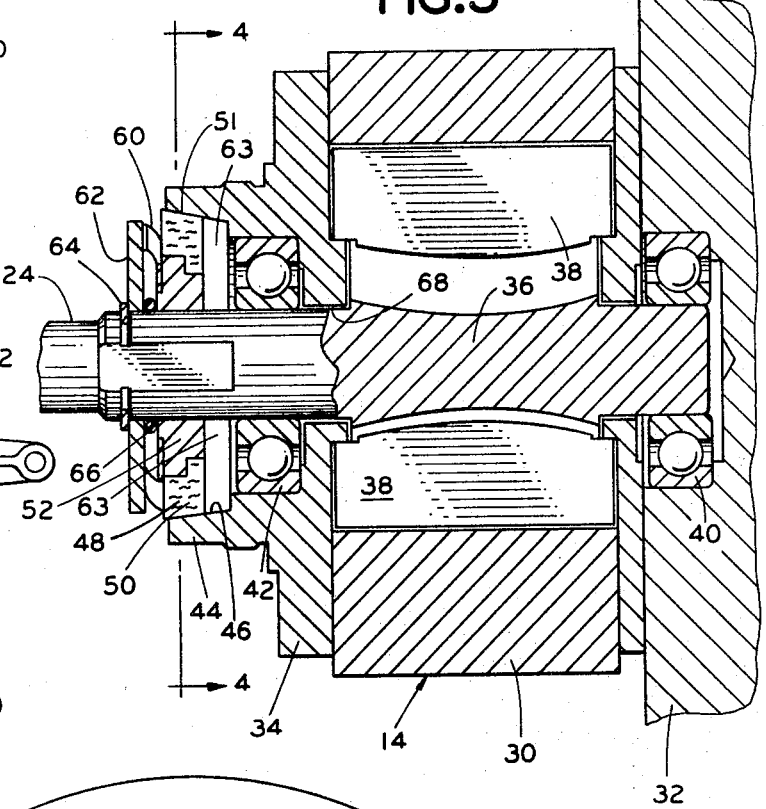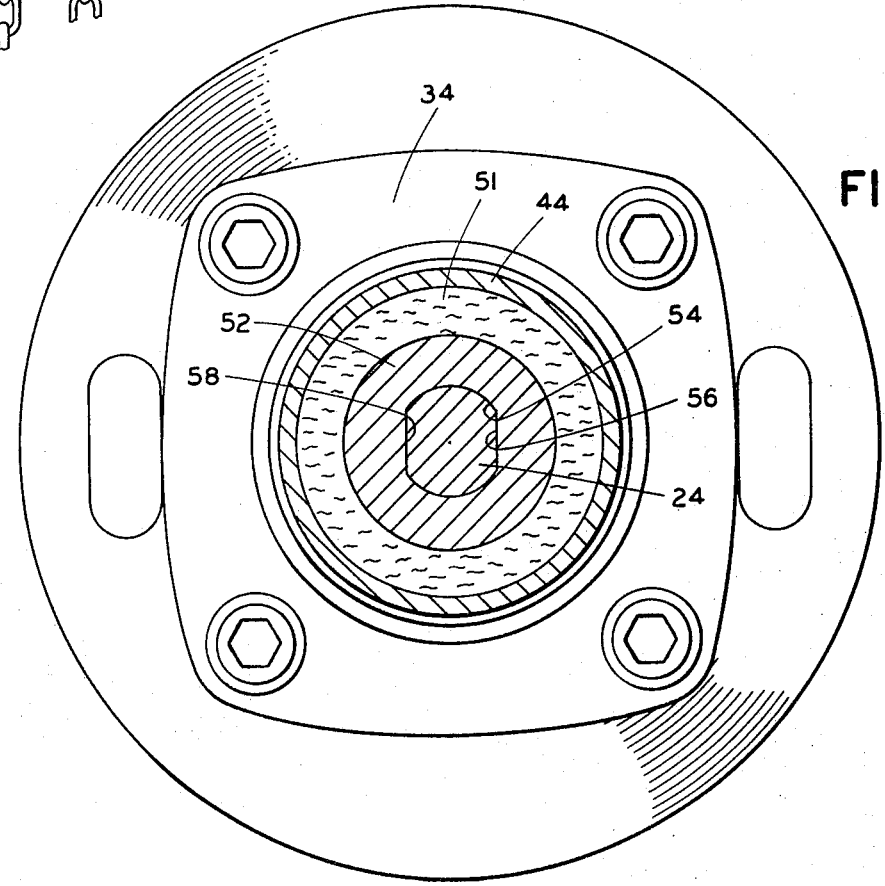

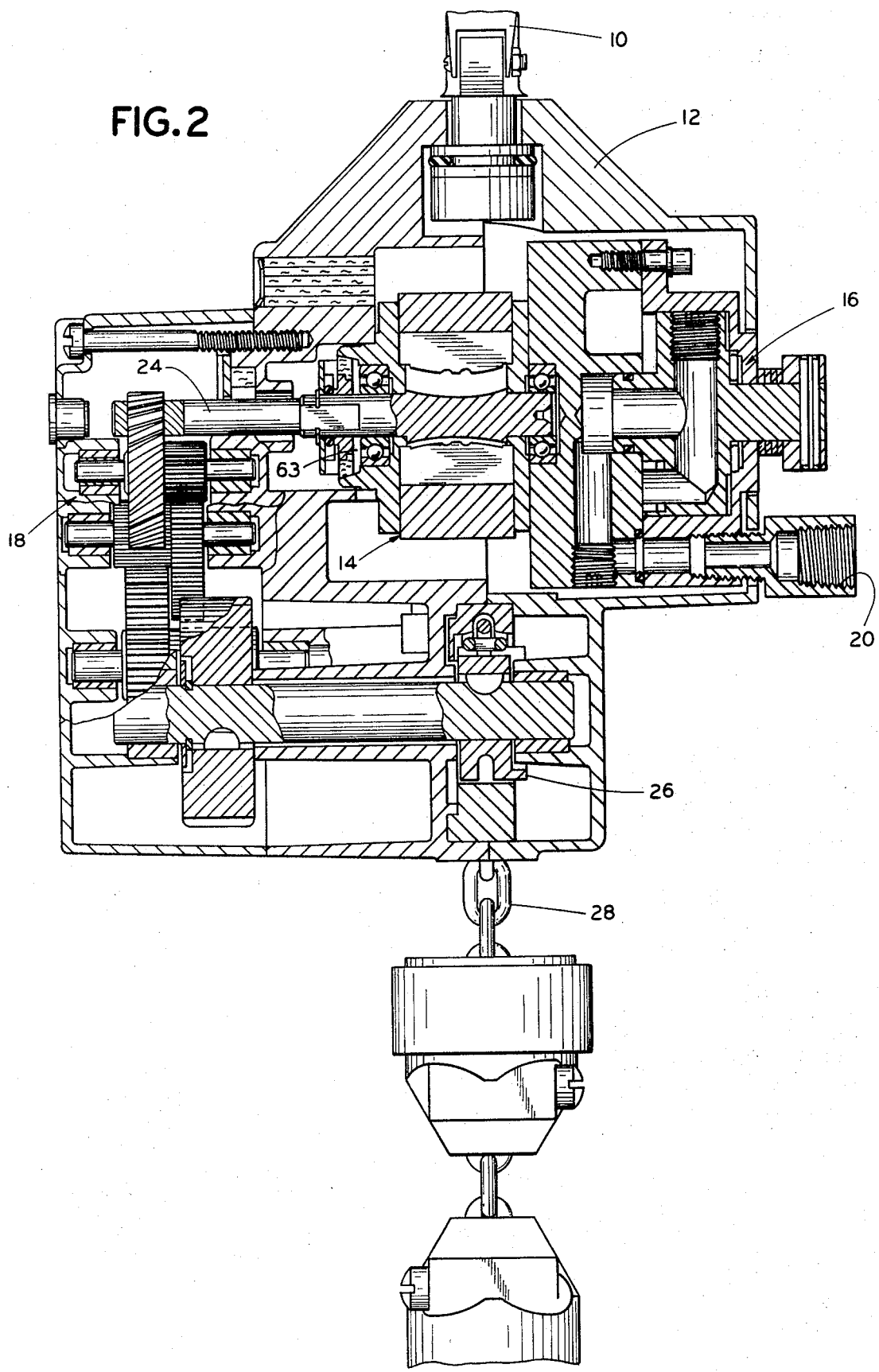

PNEUMATIC OPERATED MOTOR AND BRAKE FOR HOIST

BACKGROUND OF THE INVENTION

The present invention relates to an improved brake construction for a pneumatic hoist.

A hoist of the type powered by a rotary vane air motor has many uses. Generally, such a hoist operates to positively raise or positively lower a load on a chain which is driven by the air motor. When the motor controls are in the neutral or non-actuating position, a brake is normally engaged to prevent the load on the hoist from moving or descending. A typical construction of an air motor including a brake control is disclosed in U.S. Pat. No. 2,823,775.

The braking mechanisms associated with such hoists include special linkages, cams, brake shoes and the like which are operated in response to the movement of control arms or control levers associated with operation of the air motor. The present invention eliminates such linkages and provides a positive means of controlling and holding a load suspended by a hoist automatically in response to operation of the air motor. In addition, the improved brake construction of the present invention is self-adjusting self-cooling, contained within the hoist assembly to prevent damage from external causes, and automatically controlled in operation and sequence of operation in response to the running of the air motor.

SUMMARY OF THE INVENTION

In a principal aspect, the present invention comprises an improved brake construction for a rotary vane air motor. The brake includes a brake drum defined in the motor housing and a brake member axially slidable on the output shaft of the motor for engagement with the brake drum. Biasing means normally maintain the brake member in contact with the brake drum. An air inlet to the opposite side of the brake member is connected with the source of air pressure for the air motor. Thus, when the motor is operated, the air pressure causes the brake member to be moved against the normal biasing force and be disengaged from the brake drum thereby permiting free running operation of the air motor.

It is thus an object of the present invention to provide an improved brake construction for an air hoist which is simple and inexpensive to manufacture.

It is a further object of the present invention to provide a brake construction for an air hoist which is located within the air hoist and not subject to damage by external causes.

Still another object of the present invention is to provide a brake construction which is controlled by response to pressurized air from the control valve for the air motor thereby providing proper timing for disengagement and engagement of the brake during hoist operation.

A further object of the present invention is to provide a brake construction wherein the braking effort is multiplied by the gearing associated with the drive shaft output of the air motor.

A further object of the present invention is to provide a brake wheel for an air motor wherein the friction surfaces of the brake member are cooled by a flow of pressurized air over those surfaces thereby maintaining the coefficient of friction of the brake surfaces at a consistent level and also reducing wear on the friction surfaces.

One further object of the present invention is to provide a brake design which automatically compensates for wear, thereby requiring no manual adjustment.

Another object of the present invention is to provide a brake construction which is engaged and disengaged in response to pressurized air, the normal engagement position being a result of the removal of air pressure and the provision of a spring bias.

A further object of the present invention is to include damping means for a brake construction which will prevent fluttering or vibration of the brake when disengaged.

These and other objects, advantages and features of the present invention will be set forth in detail in the description which follows.

BRIEF DESCRIPTION OF THE DRAWING

In the detailed description which follows, reference will be made to the drawings comprised of the following Figures:

FIG. 1 is an end view of a typical air hoist construction utilizing the improvement of the present invention;

FIG. 2 is a cross-sectional view of an air hoist utilizing the improvement of the present invention;

FIG. 3 is an enlarged cross-sectional view of the brake construction of the present invention and the rotary vane air motor as utilized in the air hoist of FIG. 2; and FIG. 4 is a cross-sectional view of the brake construction of the present invention taken substantially along the line 4—4 in FIG. 3.

DESCRIPTION OF THE PREFERRED EMBODIMENT

FIG. 1 illustrates an entire pneumatic or air hoist assembly. The hoist assembly includes a suspension hook 10 for supporting the air hoist assembly from a cross beam or the like. The hook 10 is attached to a housing 12 as also illustrated in FIG. 2. A rotary vane air motor 14 is mounted within the housing 12 between a control valve assembly 16 and gearing 18. Pressurized air is supplied to an air inlet 20 and flows to the motor 14 in response to actuation of a control arm 22 associated with the control valve assembly 16.

An output shaft 24 of the air motor 14 operates the gearing 18 and pocket wheel 26 to thereby raise or lower a chain 28. Thus, by manually swinging the control arm 22 in a counterclockwise direction as viewed in FIG. 1, a hook (not shown) attached to the chain 28 will be raised. Clockwise movement of the control arm 22 will cause a lowering of the hook (not shown). Thus, rotation of the control arm actuates the control valve assembly 16 in order to drive the rotary air motor 14 in the clockwise or counterclockwise direction depending upon the desired direction of travel of the chain 28 and load hook (not shown. When the desired travel of the chain 28 and attached load hook (not shown) is achieved, the supply of pressurized air to the air motor is stopped as the control arm 22 is spring returned to its neutral or off position as illustrated in FIG. 1.

The subject matter of the present invention relates to the specific brake construction associated with the output shaft 24 of the air motor 14. FIGS. 3 and 4 illustrate this brake construction in greater detail. Referring to these FIGURES, the air motor 14 includes a motor cylinder 30, end plates 32 and 34, a rotor spindle 36, which also serves or is integral with the output shaft 24 previously described, and vanes 38. The opposite ends of the spindle 36 are mounted in bearings 40 and 42 in end plates 32 and 34 respectively. Spindle 36 and shaft 24 rotate about the longitudinal axis thereof.

The end plate 32 and cylinder 30 are provided with pressurized air inlet and low pressure exhaust air outlet passages. Thus, air supplied to the inlet 20 as illustrated in FIG. 2 is introduced via appropriate porting to drive the vanes 38 and thus the spindle 36 in the desired direction. The structural features so far described are well known to those skilled in the art.

The subject matter of the present invention is now described. End plate 34 includes a projecting circular flange 44 which defines an internal frusto-conical or brake drum surface 46. A frusto-conical brake wheel 48 includes an axial opening 54 and is slidably mounted for translation along the shaft 24.

The brake wheel 48 is a two-part assembly. The outer part 50 is a ring of molded friction material and is attached to the inner part 52 which is a steel ring. Inner part 52 includes the axial opening 54 as illustrated in FIG. 4 having opposed flats 56 and 58 which serve to key the wheel 48 to the shaft 24. The wheel 48 thus rotates with the shaft 24 though it may be translated longitudinally along the axis of the shaft 24 in response to the forces to be described below.

The wheel 48 is normally maintained in contact with the flange 44 by the biasing force of a finger spring 60 which engages the outside surface of the wheel 48. Finger spring 60 is maintained in a fixed position by washer 62 held by retainer ring 64. A ring of elastomeric material or O-ring 66 is interposed between washer 62 and the outside surface of wheel 48.

An air passage connects the interior of the cylinder 30 and a chamber 63 defined by the flange 44, backplate 34, bearings 42 and wheel 48. The air passage is defined by the space between spindle bore 68 in plate 34 and spindle 36 as well as around or through the bearings 42. The flow of air through the bore 68 and around the bearings 42, which is due to the necessary cleanances between the spindle 36 and the end plate 34 as well as through the bearings 42, is generally sufficient to operate the brake wheel 48 against the spring 60.

Thus, air, which pressurizes the interior of the cylinder 30 as the rotary vane air motor is operated, also pressurizes the chamber 63 or the back side of the wheel 48. In response to this pressure, the wheel 48 is translated laterally to the left in FIG. 3 against the biasing force of spring 60. This causes the outer portion 50 and, in particular, the tapered outside surface 51 of the outer portion 50 of wheel 48 to be disengaged from the inside tapered surface 46 of flange 44. In this manner, the brake of the air hoist is released.

The accumulation of air pressure within the chamber 63 provides a necessary timing sequence for disengagement of the brake subsequent to initial operation of the motor 14, enabling the motor 14 to assume complete control over the load suspended from chain 28. That is, brake release occurs when the pressure value in the chamber 63 results in a force against the brake wheel 48 which exceeds the opposing force exerted by the spring bias of the finger spring 60. The brake wheel 48 moves toward the finger spring 60 and the cone shaped surface 51 of the brake wheel 48 is no longer in fixed friction contact with the surface 46 of end plate 34.

As this movement occurs, a flow of pressurized air between the tapered surfaces 51 and 46 of the brake wheel 48 and end plate 34 imparts a cooling effect to these engaging surfaces thereby maintaining the coefficient of friction of these surfaces at a consistent level and also effecting reduced wear on the friction surfaces.

Ring 66 serves to dampen any fluttering or vibration of the wheel 48 when it is disengaged from the flange 44 as described above.

Re-engagement of the brake wheel 48 will occur when the supply of pressurized air to the air motor 14 is shut off by the control valve assembly 16. That is, the spring bias exerted by the finger spring 60 will serve to move the brake wheel 48 axially to engage its cone shape surface 51 with the mating surface 46 of the end plate 34 to thereby achieve the necessary braking effect.

An important advantage of this structure is that it accommodates for wear of the engaging frictional cone shaped surfaces 51 and 46. This results because of the cone shape of the surfaces and the fact that the spring 60 will always tend to bias the wheel 48 against the surface 44. Manual adjustment for wear is thus not required.

Because the brake assembly is interposed between the air motor 14 and the gearing 18, the wear rate of the brake parts is greatly reduced. This results because the braking effect of the brake assembly is multiplied by the gear ratio through the gearing 18. Consequently, the brake parts may be relatively small and subject to low stresses while performing their function, and the brake assembly may be included easily within the internal construction of the air hoist.

Certain changes in structure are possible within the scope of the present invention. For example, the brake drum may be mounted on the shaft to engage a friction brake material attached or fixed to the housing. Therefore, the subject matter of the present invention shall be limited only by the following claims and their equivalents.

What is claimed is:

1. An air motor driven device comprising in combination:

a housing with a rotary air motor, said motor having an output shaft;

said housing also including an end plate with means for mounting the shaft through said plate;

brake means for said motor, said brake means including:

a fixed friction surface defined in said housing;

a rotating member mounted to rotate with said shaft, said member also including a friction surface;

biasing means engaging one side of said member and biasing said friction surface of said member axially into cooperative braking contact with said fixed friction surface; and fluid inlet path means consisting only of clearances for fluid flow where said shaft extends through said end plate, said fluid providing a brake disengaging force to the opposite side of said member being displaced axially on said shaft to disengage said surfaces against the force of said biasing means when said motor is operated.

2. The device of claim 1 wherein said shaft is keyed to said member.

3. The device of claim 1 wherein said member is comprised of an outer peripheral portion of friction material and an inner ring portion engaged with said shaft member.

4. The device of claim 1 including means on said shaft for damping the motion of said member axially on said shaft to prevent undesired vibration and noise.

5. The device of claim 1 wherein said member is a generally frusto-conical member having the frusto-conical axis substantially coincident with the shaft axis, the frusto-conical surface of said member cooperatively engaging substantially the coincident fixed friction surface of said housing.

6. The device of claim 1 wherein said member cooperates with said housing to form a chamber connected with said fluid inlet path means on said opposite side of said member.

7. The device of claim 1 wherein said housing encloses said brake means and shields said brake means from external exposure to dirt and the like.

8. The device of claim 1 including gear means connected with said shaft, said gear means cooperative with means for moving material, said gear means serving to provide a mechanical advantage to the brake means of the present invention.

9. The device of claim 1 wherein said fixed friction surface is a brake drum integral with said housing.

10. The device of claim 1 wherein said clearances provide an air flow path to effect sequential operation by release of said brake means subsequent to activation of the air motor.

* * * * *